United States Patent
Lin et al.

(10) Patent No.: US 11,513,278 B2
(45) Date of Patent: *Nov. 29, 2022

(54) LIGHTING DEVICE

(71) Applicant: InnoLux Corporation, Miao-Li County (TW)

(72) Inventors: Hsiao-Lang Lin, Miao-Li County (TW); Tsung-Han Tsai, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/412,233

(22) Filed: Aug. 25, 2021

(65) Prior Publication Data

US 2021/0382220 A1 Dec. 9, 2021

Related U.S. Application Data

(63) Continuation of application No. 16/223,013, filed on Dec. 17, 2018, now Pat. No. 11,125,930.

(51) Int. Cl.
F21V 8/00 (2006.01)

(52) U.S. Cl.
CPC ........... G02B 6/005 (2013.01); G02B 6/0053 (2013.01); G02B 6/0055 (2013.01)

(58) Field of Classification Search
CPC ..... G02B 6/005; G02B 6/0053; G02B 6/0055
See application file for complete search history.

(56) References Cited

U.S. PATENT DOCUMENTS

| 7,819,539 | B2* | 10/2010 | Kim | H01L 33/507 |
| | | | | 362/97.3 |
| 10,802,203 | B2* | 10/2020 | Masuda | G02F 1/133528 |
| 2015/0003059 | A1 | 1/2015 | Haitz | |
| 2015/0171284 | A1 | 6/2015 | Bechtel | |
| 2017/0242183 | A1* | 8/2017 | Song | G02F 1/133621 |
| 2018/0106940 | A1* | 4/2018 | Kim | G02B 6/0053 |

FOREIGN PATENT DOCUMENTS

| CN | 103631052 A | 3/2014 |
| CN | 203757399 U | 8/2014 |
| CN | 104521016 A | 4/2015 |
| CN | 106931333 A | 7/2017 |

* cited by examiner

*Primary Examiner* — Matthew J. Peerce
(74) *Attorney, Agent, or Firm* — Winston Hsu

(57) ABSTRACT

A lighting device includes a plurality of first lighting units emitting a first output light. Each of the first lighting units includes a first light source, a first reflective layer, and a first light converting structure. The first light source is configured to provide the first output light. The first reflective layer is configured to reflect the first output light. The first light converting structure is configured to convert the first output light. The first output light has a sub peak between 400 nm and 500 nm and a main peak between 590 nm and 780 nm, and a normal intensity of the sub peak is greater than a tilt intensity of the sub peak. The normal intensity is measured along a normal direction, the tilt intensity is measured along a tilt direction, and the normal direction is different from the tilt direction.

12 Claims, 9 Drawing Sheets

LIGHTING DEVICE

CROSS REFERENCE TO RELATED APPLICATIONS

This patent application is a continuation application and claims priority of U.S. patent application Ser. No. 16/223, 013, field on Dec. 17, 2018, and the entire contents of which are incorporated herein by reference.

BACKGROUND OF THE DISCLOSURE

1. Field of the Disclosure

The present disclosure relates to a lighting device, and more particularly to a lighting device including a light adjusting structure.

2. Description of the Prior Art

In the conventional lighting devices, the input light may emit to the adjacent lighting units and affect the adjacent lighting units, so the lighting quality (or display quality) can reduce. Therefore, the present disclosure proposes a lighting device that can reduce the above problems.

SUMMARY OF THE DISCLOSURE

In some embodiments, a lighting device includes a plurality of first lighting units emitting a first output light. Each of the plurality of first lighting units includes a first light source, a first reflective layer, and a first light converting structure. The first light source is configured to provide the first output light. The first reflective layer is configured to reflect the first output light. The first light converting structure is configured to convert the first output light. The first output light has a sub peak between 400 nm and 500 nm and a main peak between 590 nm and 780 nm, and a normal intensity of the sub peak is greater than a tilt intensity of the sub peak. The normal intensity of the first output light is measured along a normal direction, the tilt intensity of the first output light is measured along a tilt direction, and the normal direction is different from the tilt direction.

In some embodiments, a lighting device includes a plurality of lighting units emitting an output light. Each of the plurality of lighting units includes a light source, a reflective layer, and a light converting structure. The light source is configured to provide the output light. The reflective layer is configured to reflect the output light. The light converting structure is configured to convert the output light. The output light has a sub peak between 400 nm and 500 nm and a main peak between 520 nm and 589 nm, and a normal intensity of the sub peak is greater than a tilt intensity of the sub peak. The normal intensity of the output light is measured along a normal direction, the tilt intensity of the output light is measured along a tilt direction, and the normal direction is different from the tilt direction.

In some embodiments, a lighting device includes a plurality of first lighting units emitting a first light. Each of the plurality of first lighting units includes a light source, a light adjusting structure and a light converting structure, wherein the first light is provided by the light source, adjusted by the light adjusting structure and converted by the light converting structure. The first light has a sub peak between 400 nm and 500 nm and a main peak between 590 nm and 780 nm, and a normal intensity of the sub peak is greater than a tilt intensity of the sub peak.

In some embodiments, a lighting device includes a plurality of lighting units emitting a light. Each of the plurality of lighting units includes a light source, a light adjusting structure and a light converting structure, wherein the light is provided by the light source, adjusted by the light adjusting structure, and converted by the light converting structure. The light has a sub peak between 400 nm and 500 nm and a main peak between 500 nm and 589 nm, and a normal intensity of the sub peak is greater than a tilt intensity of the sub peak.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. For purposes of illustrative clarity understood, various drawings of this disclosure show a portion of the lighting device, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, lighting equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to".

When an element or layer is referred to as being "on" or "connected to" another element or layer, it can be directly on or directly connected to the other element or layer, or intervening elements or layers may be presented. In contrast, when an element is referred to as being "directly on" or "directly connected to" another element or layer, there are no intervening elements or layers presented.

The terms "about", "substantially", "equal", or "same" generally mean within 20% of a given value or range, or mean within 10%, 5%, 3%, 2%, 1%, or 0.5% of a given value or range.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

The technical features in different embodiments described in the following can be replaced, recombined, or mixed with one another to constitute another embodiment without departing from the spirit of the present disclosure.

Figure 1:
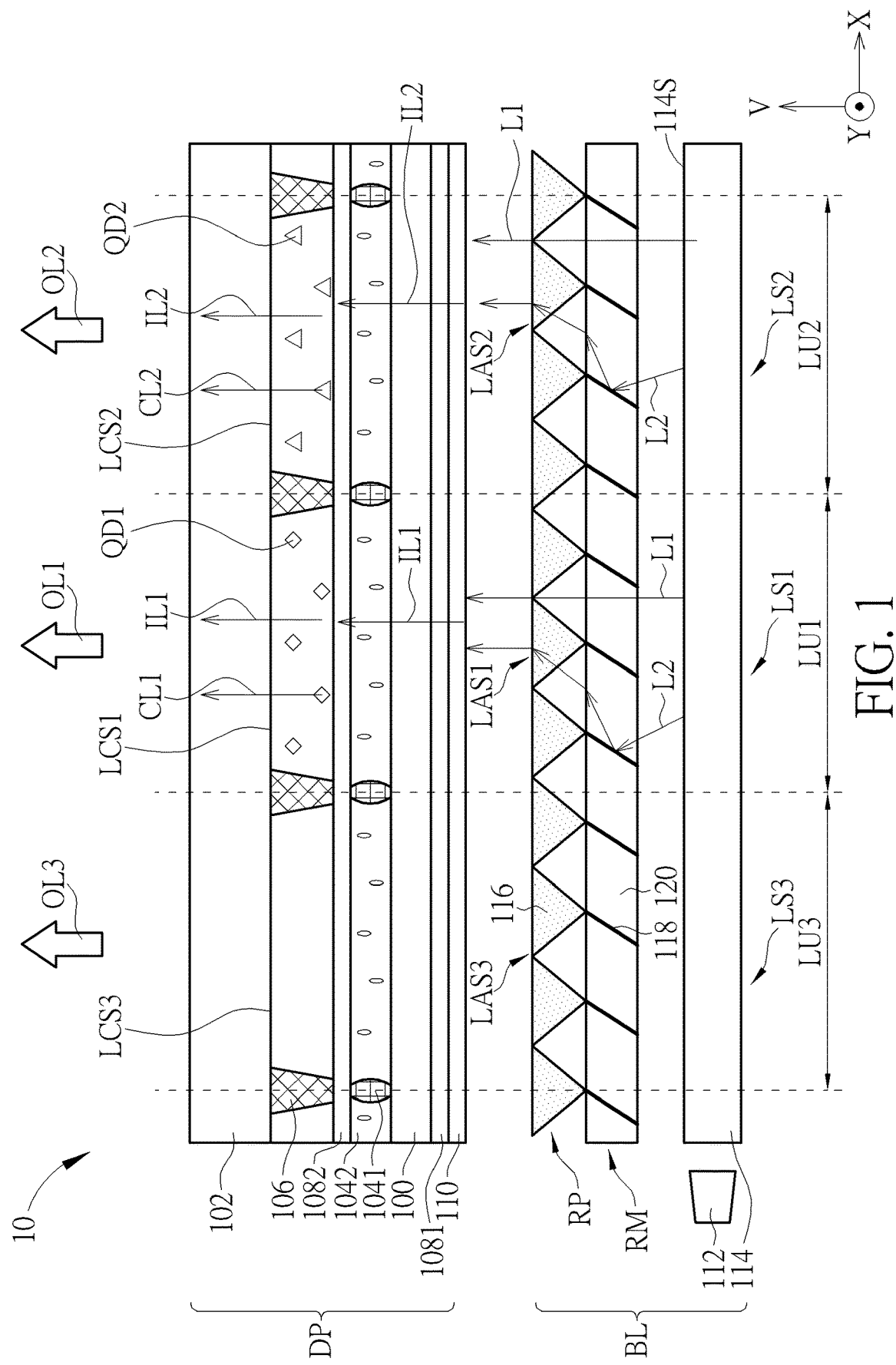
FIG. 1 is a schematic diagram illustrating a cross-sectional view of a lighting device according to a first embodiment of the present disclosure.

Referring to FIG. 1, it is a schematic diagram illustrating a cross-sectional view of a lighting device according to a first embodiment. The lighting device may include a display device, an electronic device, a flexible device, or other suitable devices, but not limited thereto. The lighting device may be applied to a tilt device. For example, the lighting device 10 may include a panel DP and a backlight module BL, and the panel DP is disposed opposite to the backlight module BL. The panel DP may include a first substrate 100, a second substrate 102, and a light modulating layer 1042 disposed between the first substrate 100 and the second substrate 102. The first substrate 100 may be disposed between the light modulating layer 1042 and the backlight module BL. The first substrate 100 and the second substrate 102 may include transparent substrates, for example, a rigid substrate includes a glass substrate or a quartz substrate, or a flexible substrate includes a plastic substrate, but not limited thereto. The material of the plastic substrate may include polyimide (PI), polycarbonate (PC), or polyethylene terephthalate (PET), but not limited thereto. In some embodiments, the panel DP may be a liquid crystal panel, and the light modulating layer 1042 may be a liquid crystal layer, and some spacers 1041 may be disposed between the first substrate 100 and the second substrate 102. The first substrate 100 may be an array substrate. The second substrate 102 may be a color filter substrate or protective substrate, but not limited thereto. For example, transistors, signal lines (such as scan lines or data lines), or insulating layers may be disposed on the first substrate 100, but not limited thereto.

The panel DP may include alignment layers, electrodes (e.g. pixel electrodes or common electrodes), or a shielding structure 106, but not limited thereto. For example, the shielding structure 106 may be disposed between the second substrate 102 and the first substrate 100. The shielding structure 106 may include a plurality of apertures, and a light converting structure (such as the light converting structure LCS1, LCS2, or LCS3) may be disposed in the corresponding aperture of the shielding structure 106. In some embodiments, a light converting structure may be disposed corresponding to the corresponding aperture of the shielding structure 106. The material of the shielding structure 106 may include black photoresist, black printing ink, black resin, other suitable material or combinations thereof, but not limited thereto.

In some embodiments, the panel DP may include a polarizer 1081 and a polarizer 1082. The polarizer 1081 may be disposed between the first substrate 100 and the backlight module BL, and the polarizer 1082 may be disposed between the light converting structures and the light modulating layer 1042. However, the polarizer 1081 and the polarizer 1082 are not limited to be disposed at the above-mentioned locations. In some embodiments, the lighting device may have the light modulating layer 1042 (such as liquid crystal), and the light modulating layer 1042 may be disposed between two polarizers for adjusting gray scale, so the light converting structures may not be disposed between two polarizers. In some embodiments, the polarizer 1081 and the polarizer 1082 may be disposed between the first substrate 100 and the second substrate 102, and the polarizer 1081 and the polarizer 1082 may include metal wires, which can be so-called wire grid polarizer (WGP), but is not limited thereto. The material of metal wire includes metal, metal alloy, other suitable materials or combination thereof, but is not limited thereto. In some embodiments, the first substrate 100 and the second substrate 102 may be disposed between the polarizer 1081 and the polarizer 1082, the materials of polarizer 1081 and the polarizer 1082 may include protective film, tri-acetate cellulose (TAC), polyvinyl alcohol (PVA), pressure sensitive adhesive (PSA), release film, but is not limited thereto.

In some embodiments, the panel DP may include at least one optical film 110 disposed between the first substrate 100 and the backlight module BL. In some embodiments, the optical film 110 includes dual brightness enhancement film (DBEF), prism film, other suitable optical films, or combination thereof, but not limited thereto.

The backlight module BL may include a light emitting source 112 and an optical layer 114. As shown in FIG. 1, the backlight module BL may be an edge-lit type backlight module, and the light emitting source 112 may be disposed near at least one sidewall of the optical layer 114, but not limited thereto. The light emitting source 112 may include light emitting diode (LED), micro-LED, mini-LED, organic light-emitting diode (OLED), quantum dots LEDs (QLEDs or QD-LEDs), quantum dots (QD), fluorescent material, phosphor material, other suitable light sources or combinations thereof, but not limited thereto. In some embodiments, the backlight module BL can emit blue light or UV light, but not limited thereto. The optical layer 114 may include the light guide plate, diffuser plate or other optical films (or plates). As shown in FIG. 1, a light L1 approximately parallel to a normal direction V may be emitted from a surface 114S of the optical layer 114. An oblique light L2 may be emitted from the surface 114S of the optical layer 114, and the oblique light L2 may not be parallel to the normal direction V of the substrate 100.

As shown in FIG. 1, the lighting device 10 includes a plurality of first lighting units LU1, a plurality of second lighting units LU2, and a plurality of third lighting units LU3. In some embodiments, the lighting device 10 includes other units. In some embodiments, at least one of the first lighting units LU1 includes a light source LS1, a light adjusting structure LAS1, and a light converting structure LCS1, at least one of the second lighting units LU2 includes a light source LS2, a light adjusting structure LAS2, and a light converting structure LCS2, and at least one of the third lighting units LU3 includes a light source LS3, a light adjusting structure LAS3, and a light converting structure LCS3. In some embodiments, the light converting structures (such as LCS1, LCS2, LCS3) may be respectively disposed on the light sources (such as LS1, LS2, LS3). In some embodiments, the light modulating layer 1042 can be disposed between the light sources and the light converting structures. One lighting unit may correspond to one aperture of the shielding structure 106 as shown in FIG. 1. For example, one lighting unit may correspond to all the elements in a vertical region of one aperture as shown in FIG. 1. In some embodiments, the lighting units may be sub-pixels (such as red sub-pixel, green sub-pixel, or blue sub-pixel, but not limited thereto).

In some embodiments, the light adjusting structure can be disposed on the light source, or the light adjusting structure can be disposed between the light source and the light converting structure. In some embodiments, the light adjusting structure may be included in the backlight module BL. In some embodiments, the light adjusting structure is continuous. As shown in FIG. 1 the light adjusting structures LAS1, LAS2, and LAS3 may be connected with each other. In some embodiments, the light adjusting structures LAS1, LAS2, or LAS3 may be a lens structure. For example, the light adjusting structures LAS1, LAS2, LAS3 form a lens structure, which may include a reflecting member RM and a reverse prism sheet RP disposed on the reflecting member RM. The reverse prism sheet RP may include a plurality of reverse prisms 116 connected with each other. For example, the tip of one of the reverse prisms 116 may face to (adjacent to) the reflecting member RM. In some embodiments, the reflecting member RM may include a barrier film 120 and a plurality of reflecting surfaces 118 disposed in the barrier film 120. The tilt angle between one of the reflecting surfaces 118 and the direction X may be in a range between 20 and 80 degrees, or between 30 and 70 degrees. In some embodiments, the tilt angle between one of the reflecting surfaces 118 and the direction X may be adjusted according to the requirements. The material of the reflecting surfaces 118 may include metal, white reflective material or other suitable reflective materials, but not limited thereto. The material of the barrier film 120 may include transparent material, insulating material, but not limited thereto.

Taking the light source LS1 and the light adjusting structure LAS1 as an example, the light L1 emitted by the light source LS1 may be approximately parallel to the normal direction V, and the direction of the light L1 may not be altered by the light adjusting structure LAS1, and the light L1 may still be approximately parallel to the normal direction V after penetrating through the light adjusting structure LAS1, but not limited thereto. In addition, the oblique light L2 may be reflected by at least one of the reflecting surfaces 118 of the reflecting member RM, and then be refracted by at least one of the reverse prisms 116 of the reverse prism sheet RP. Accordingly, the direction of the oblique light L2 may be adjusted to be approximately parallel to the normal direction V after passing through the light adjusting structure LAS1. It should be noted that, although the FIG. 1 only shows the oblique light L2 and the light L1, but it is not limited. In fact, the light emitted from a surface 114S of the optical layer 114 may be a scattered light. The light path of the oblique light L2 (and the light L1) in the illustration is only an example, but is not limited thereto.

Therefore, the light adjusting structures (such as LAS1, LAS2, and LAS3) can increase the collimation of the light, or provide light collimating effect, and the light may be approximately parallel to the normal direction V after passing through the light adjusting structures (such as LAS1, LAS2, or LAS3). For example, an input light IL1 may be a mixed light formed by at least the light L1 and the oblique light L2 adjusted through the light adjusting structure LAS1, and the input light IL1 may be approximately parallel to the normal direction V (or collimated).

As shown in FIG. 1, the light converting structure LCS1 may include quantum dots QD1, the quantum dots QD1 can be excited by a portion of the input light ILL and the portion of the input light IL1 may be converted into a light CL1 by the quantum dots QD1, so a first light OL1 may be the mixture of the light CL1 and the unconverted input light ILL In other words, the first light OL1 may be provided by the light source LS1, adjusted by the light adjusting structure LSA1, and converted by the light converting structure LCS1. The first light OL1 may be an output light emitted from the first lighting unit LU1. In this disclosure, the output light could be regarded as the final visual light of the lighting device 10 perceived by the observer.

As shown in FIG. 1, the light converting structure LCS2 may include quantum dots QD2, the quantum dots QD2 can be excited by a portion of the input light IL2 (e.g. the collimated light adjusted by the light adjusting structure LAS2), and the portion of the input light IL2 may be converted into a light CL2 by the quantum dots QD2. The quantum dots QD2 may be different from the quantum dots QD1. A second light OL2 may be the mixture of the light CL2 and the unconverted input light IL2. In other words, the second light OL2 may be provided by the light source LS2, adjusted by the light adjusting structure LSA2, and converted by the light converting structure LCS2. The second light OL2 may be an output light emitted from the second lighting unit LU2.

In some embodiments, a third light OL3 emitted by the third lighting unit LU3 can be blue light. Since the light source LS3 emits blue light, the light converting structure LCS3 may be replaced by a transparent layer, which has no quantum dots therein. The transparent layer may include transparent dielectric material, but not limited thereto. In some embodiments, the light converting structure LCS3 may include a blue color filter. In some embodiments, the light converting structure LCS3 is not included in the third lighting unit LU3. In some embodiments, the light converting structure LCS3 may include suitable type of quantum dots to adjust the wavelength of the third light OL3.

In some embodiments, the first light OL1 can be green light, the second light OL2 can be red light, and the third light OL3 can be blue light, but not limited thereto. In some embodiments, the lighting device 10 may include other lighting units emitting a light with a color different from the first light OL1, the second light OL2 and the third light OL3. In some embodiments, the lighting device 10 may include other lighting units emitting a light with different wavelength.

The light converting structures may include quantum dots, fluorescent materials, phosphorescent materials, color filter layer, other suitable materials or the combination thereof, but not limited thereto. The quantum dots may be made of a semiconductor nano-crystal structure, and can include CdSe, CdS, CdTe, ZnSe, ZnTe, ZnS, HgTe, InAs, $Cd_{1-x}Zn_xSe_{1-y}S_y$, CdSe/ZnS, InP, and GaAs, but not limited thereto. Quantum dots generally have a particle size between 1 nanometer (nm) and 30 nm, 1 nm and 20 nm, or 1 nm and 10 nm, but not limited. In one embodiment, quantum dots are excited by an input light emitted by the backlight module BL, the input light will be converted into an emitted light with different wavelength by quantum dots. The color of the emitted light may be adjusted by the material or size of the quantum dots. In other embodiments, the quantum dots may include sphere particles, rod particles or particles with any other suitable shapes as long as the quantum dots could emit light with suitable color.

Figure 2:
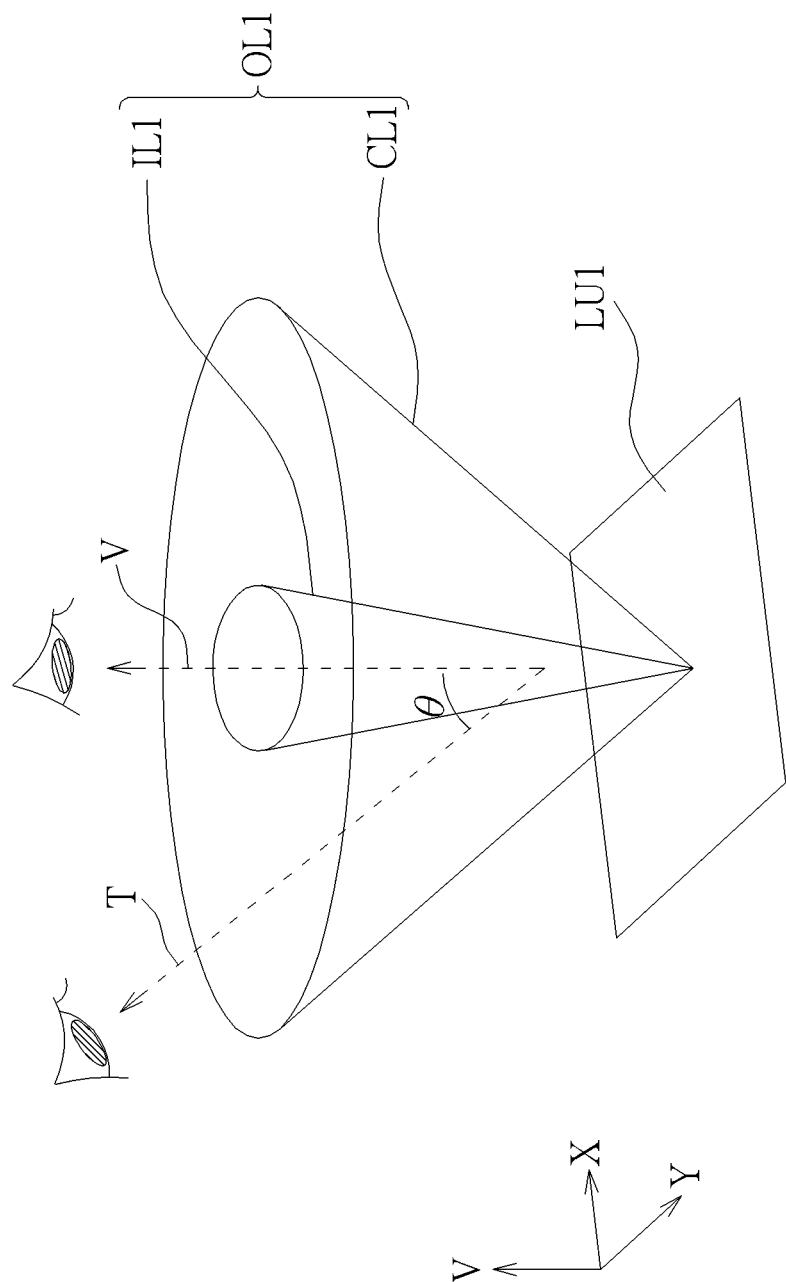
FIG. 2 is a schematic diagram illustrating the light distribution of the light emitted by the lighting unit.

Referring to FIG. 1 and FIG. 2, it is a schematic diagram illustrating the light distribution of the light emitted by the lighting unit. For example, the first light OL1 emitted by the first lighting unit LU1 may include the light CL1 and the unconverted input light ILL and the first light OL1 may be emitted from the light emitting surface of the lighting device 10. Since the unconverted input light IL1 is adjusted by the light adjusting structure LSA1, the distribution of the unconverted input light IL1 emitted out of the lighting device 10 may be more concentrated (collimated). Since the light CL1 converted by the quantum dots QD1 may be a scattered light, the distribution of the light CL1 emitted out of the lighting device 10 may be more divergent. In some embodiments, the light CL1 and the unconverted input light IL1 may have cone shaped distributions, but not limited to. The distribution region of the light CL1 may be greater than the distribution region of the unconverted input light ILL but the disclosure is not limited. In some embodiments, the second light OL2 emitted by the second lighting unit LU2 may include the same or similar characteristics of the first light OL1 described above.

Figure 3:
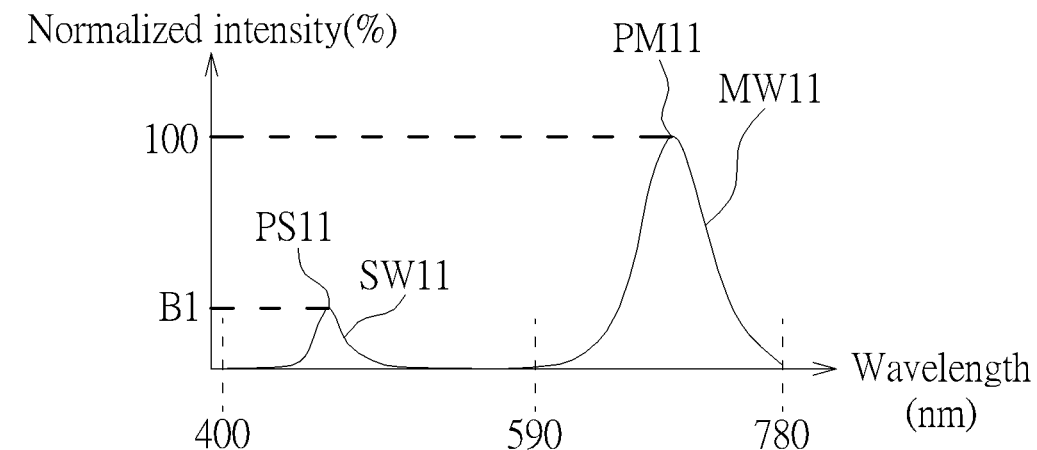
FIG. 3 is a schematic diagram illustrating light spectrums of the first light emitted by the first lighting unit in different viewing angles.
Figure 3:
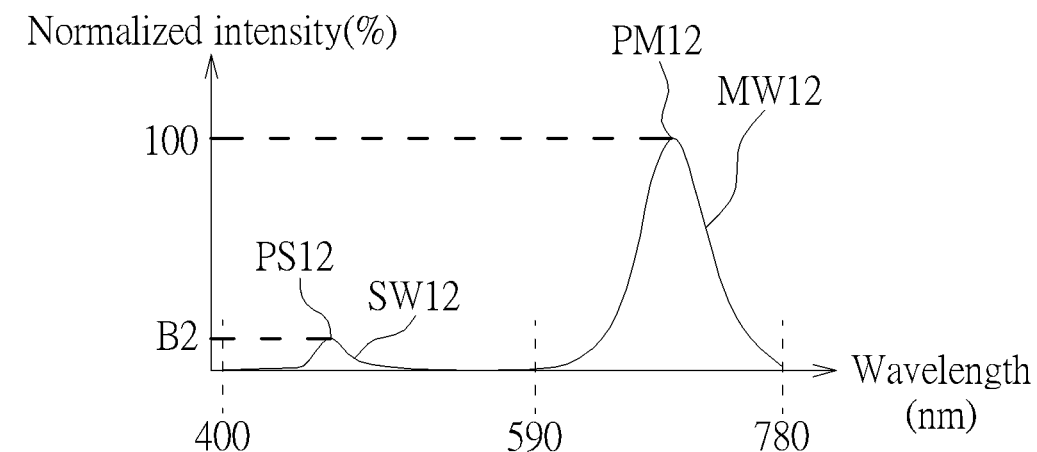

Referring to FIG. 3, it is a schematic diagram illustrating light spectrums of the first light OL1 emitted by the first lighting unit LU1 in different viewing angles. The light spectrum S11 in the part (A) of FIG. 3 may be measured along the normal direction V as shown in FIG. 2, and the light spectrum S12 in the part (B) of FIG. 3 may be measured along a tilt direction T as shown in FIG. 2. A tilt angle θ between the tilt direction T and the normal direction V may be in a range from 30 degrees to 80 degrees, wherein the normal direction V is set as zero degree, but not limited thereto. In FIG. 3, the light spectrum S11 may include a main wave MW11 and a sub-wave SW11, and the light spectrum S12 may include a main wave MW12 and a sub-wave SW12. The main waves MW11 and MW12 may represent the light CL1 converted by the light converting structure LCS1, and the sub-waves SW11 and SW12 may represent the unconverted input light IL1. The light spectrums in FIG. 3 and FIG. 4 may be normalized, and the normalized intensities of the main peaks of the main waves in the light spectrum S11 and the light spectrum S12 may be 100%. The main wave MW11 has a main peak PM11 and the sub-wave SW11 has a sub peak PS11. The main wave MW12 has a main peak PM12 and the sub-wave SW12 has a sub peak PS12. "Main peak" is defined as a crest of the main wave, and "Sub peak" is defined as a crest of the sub-wave. "Main peak" and "Sub peak" in other light spectrums may also be defined by the same way described above. In the light spectrums S11 and S12, the first light OL1 has the sub peak PS11 (or PS12) between 400 nanometers (nm) and 500 nm and the main peak PM11 (or PM12) between 590 nm and 780 nm.

As shown in the part (A) and part (B) of FIG. 3, a normal intensity B1 of the sub peak P511 is greater than a tilt intensity B2 of the sub peak PS12. The normal intensity of the sub peak means the normalized intensity of the sub peak measured along the normal direction V, and the tilt intensity of the sub peak means the normalized intensity of the sub peak measured along the tilt direction T. In some embodiments, the normal intensity B1 of the sub peak PS11 is in a range from 0.1% to 10%, and the tilt intensity B2 of the sub peak PS12 is in a range from 0.01% to 0.97%. The tilt intensity B2 of the sub peak PS12 decreases when the tilt angle θ increases according to the normal direction V of the lighting device 10. A ratio of the tilt intensity B2 of the sub peak PS12 to the normal intensity B1 of the sub peak PS11 is in a range from 0.001 to 0.97. Since the input light IL1 is adjusted by the light adjusting structure LSA1 and collimated, the possibility of the input light IL1 of the first lighting unit LU1 emitting to the adjacent lighting units (such as the second lighting unit LU2 or the third lighting unit LU3) decreases, and the lighting quality (or display quality) increases.

Figure 4:
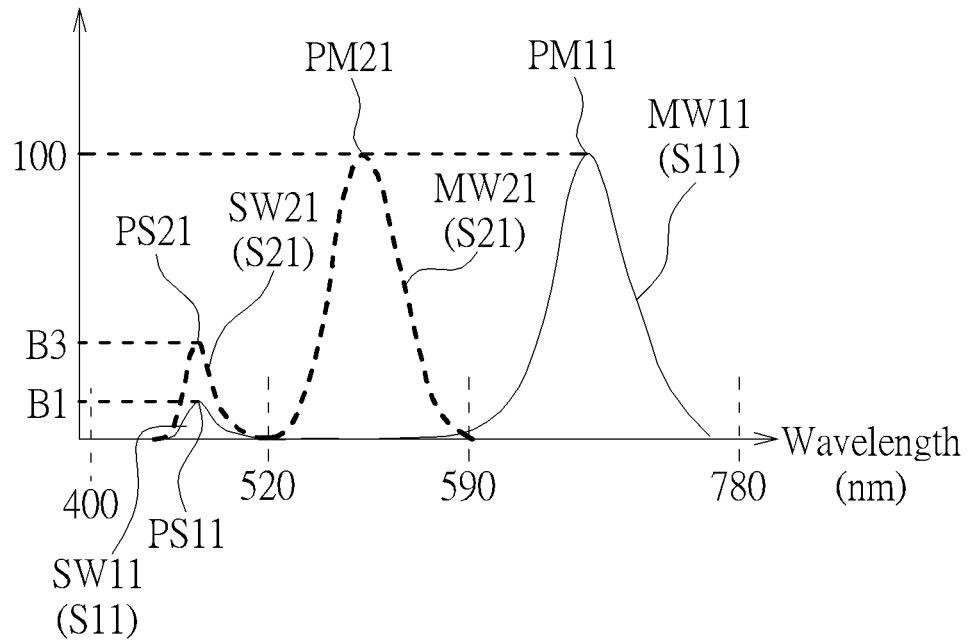
FIG. 4 is a schematic diagram illustrating light spectrums of the first light emitted by the first lighting unit and the second light emitted by the second lighting unit in different viewing angles.
Figure 4:
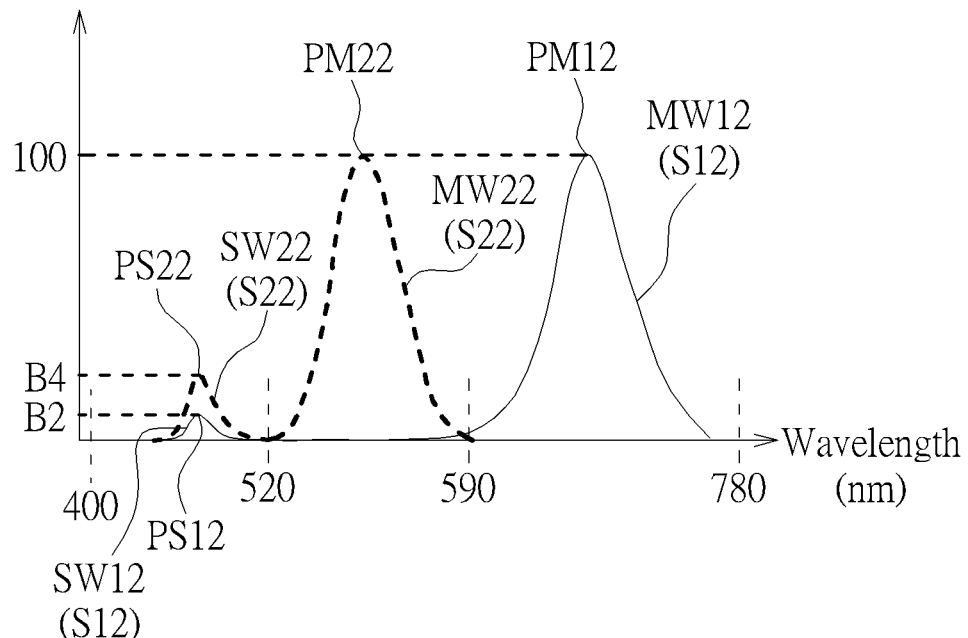

Referring to FIG. 4, it is a schematic diagram illustrating light spectrums of the first light OL1 emitted by the first lighting unit LU1 and the second light OL2 emitted by the second lighting unit LU2 in different viewing angles. The light spectrum S11 (solid line) of the first light OL1 and a light spectrum S21 (dotted line) of the second light OL2 measured along the normal direction V are shown together in the part (A) of FIG. 4, the light spectrum S12 of the first light OL1 and a light spectrum S22 of the second light OL2 measured along the tilt direction T are shown in the part (B) of FIG. 4, and the light spectrum S12 and the light spectrum S22 may be measured at the same tilt angle θ. The light spectrums S11 and S12 of the first light OL1 in FIG. 4 may be the same as those in FIG. 3, and they are not redundantly described herein. In FIG. 4, the light spectrum S21 may include a main wave MW21 and a sub-wave SW21, and the light spectrum S22 may include a main wave MW22 and a sub-wave SW22. The main waves MW21 and MW22 may represent the light CL2 converted by the light converting structure LCS2, and the sub-waves SW21 and SW22 may represent the unconverted input light IL2 in the second light OL2. The main wave MW21 has a main peak PM21 and the sub-wave SW21 has a sub peak PS21. The main wave MW22 has a main peak PM22 and the sub-wave SW22 has a sub peak PS22. In the light spectrums S21 and S22, the second light OL2 has the sub peak PS21 and PS22 between 400 nm and 500 nm and the main peak PM21 and PM22 between 520 nm and 589 nm.

As shown in the part (A) and part (B) of FIG. 4, a normal intensity B3 of the sub peak PS21 is greater than a tilt intensity B4 of the sub peak PS22. The tilt intensity B4 of the sub peak PS22 decreases when the tilt angle θ increases according to the normal direction V (zero degree) of the lighting device 10. Since the light spectrums S21 and S22 are normalized, the normal intensity B3 and the tilt intensity B4 may be values of percentages. For example, the normal intensity B3 of the sub peak PS21 is in a range from 0.1% to 20%, and the tilt intensity B4 of the sub peak PS22 is in a range from 0.01% to 1.95%. In the part (A) of FIG. 4, the normal intensity B1 of the sub peak PS11 of the first light OL1 is different from the normal intensity B3 of the sub peak PS21 of the second light OL2, and the normal intensity B1 of the sub peak PS11 is less than the normal intensity B3 of the sub peak PS21. In the part (B) of FIG. 4, the tilt intensity B2 of the sub peak PS12 of the first light OL1 is different from the tilt intensity B4 of the sub peak PS22 of the second light OL2 at the same tilt angle θ, and the tilt intensity B2 of the sub peak PS12 is less than the tilt intensity B4 of the sub peak PS22. A ratio of the tilt intensity B4 of the sub peak PS 22 to the normal intensity B3 of the sub peak PS21 is in a range from 0.001 to 0.97. Since the input light IL2 is adjusted by the light adjusting structure LSA2 and collimated, the possibility of the input light IL2 of the second lighting unit LU2 emitting to the adjacent lighting units (such as the first lighting unit LU1 or the third lighting unit LU3) decreases, and the lighting quality (or display quality) increases.

The light spectrums described above may be measured by an apparatus capable of detecting chromaticity, such as the photo detector, color analyzer CA-210, VKK USB CS1000, or spectroradiometer, but not limited thereto. The measuring apparatus may be disposed at a side of the emitting surface of the lighting units of the lighting device 10 while measuring, and the emitting surface is far from the backlight module BL or light sources. The lighting device 10 may be set up to turn on plural lighting units (the first lighting units LU1 or the second lighting units LU2) emitting lights having the same color, and the light spectrums (such as light spectrums S11, S12, S21, and S22) may be separately measured from corresponding lighting units. For example, referring to FIG. 2, the light spectrum may be measured in a range of the tilt angle θ from zero degree (i.e. the normal direction V) to 90 degrees (i.e. the direction X or the direction Y, but not limited).

The technical features in different embodiments described in this disclosure can be replaced, recombined, or mixed. For making it easier to compare the difference between these embodiments, the following description will detail the dissimilarities among different embodiments and the identical features will not be redundantly described. It should be noted that, the following illustration or drawing may only show the oblique light L2 and the light L1, but it is not limited. In fact, the light emitted from a surface 114S of the optical layer 114 may be a scattered light, and light path of the oblique light L2 (and the light L1) in the illustration is only an example, but is not limited thereto.

Figure 5:
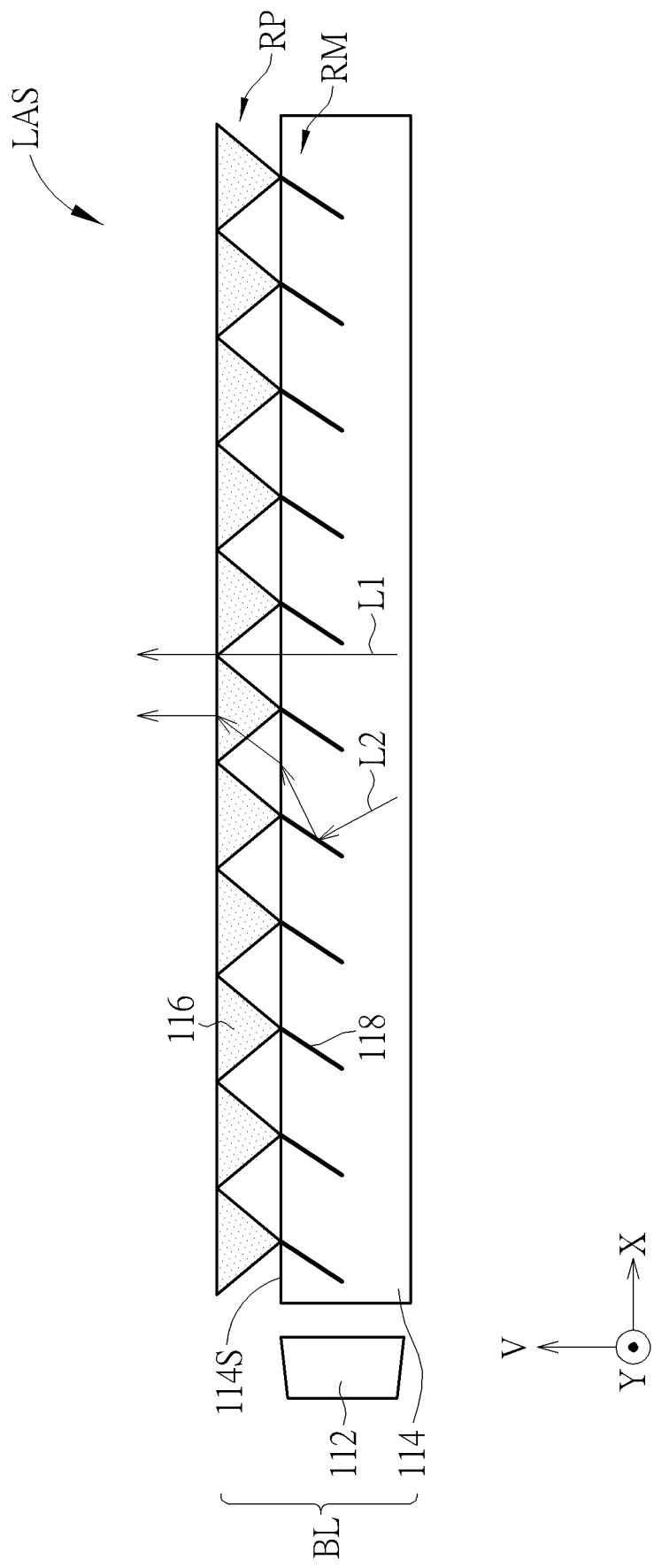
FIG. 5 is a schematic diagram illustrating a cross-sectional view of a light adjusting structure according to a second embodiment.

Referring to FIG. 5, it is a schematic diagram illustrating a cross-sectional view of a light adjusting structure according to a second embodiment. Different from the first embodiment, the reflecting member RM of the light adjusting structure LAS may be disposed into the optical layer 114, and the reflecting surfaces 118 may be disposed in a portion of the optical layer 114 close to the surface 114S of the optical layer 114, and the surface 114S is adjacent to the reverse prism sheet RP. In addition, the reverse prism sheet RP may be disposed on the surface 114S of the optical layer 114. In some embodiments, if the light L1 is approximately parallel to the normal direction V, the direction of the light L1 may not be altered by the light adjusting structure LAS, and the light L1 may still be approximately parallel to the normal direction V after penetrating through the light adjusting structure LAS. For another example, the oblique light L2 may be reflected by the reflecting surfaces 118 of the optical layer 114, and may then be refracted by the reverse prisms 116 of the reverse prism sheet RP. Accordingly, the direction of the oblique light L2 may be adjusted to be approximately parallel to the normal direction V after passing through the light adjusting structure LAS.

Figure 6:
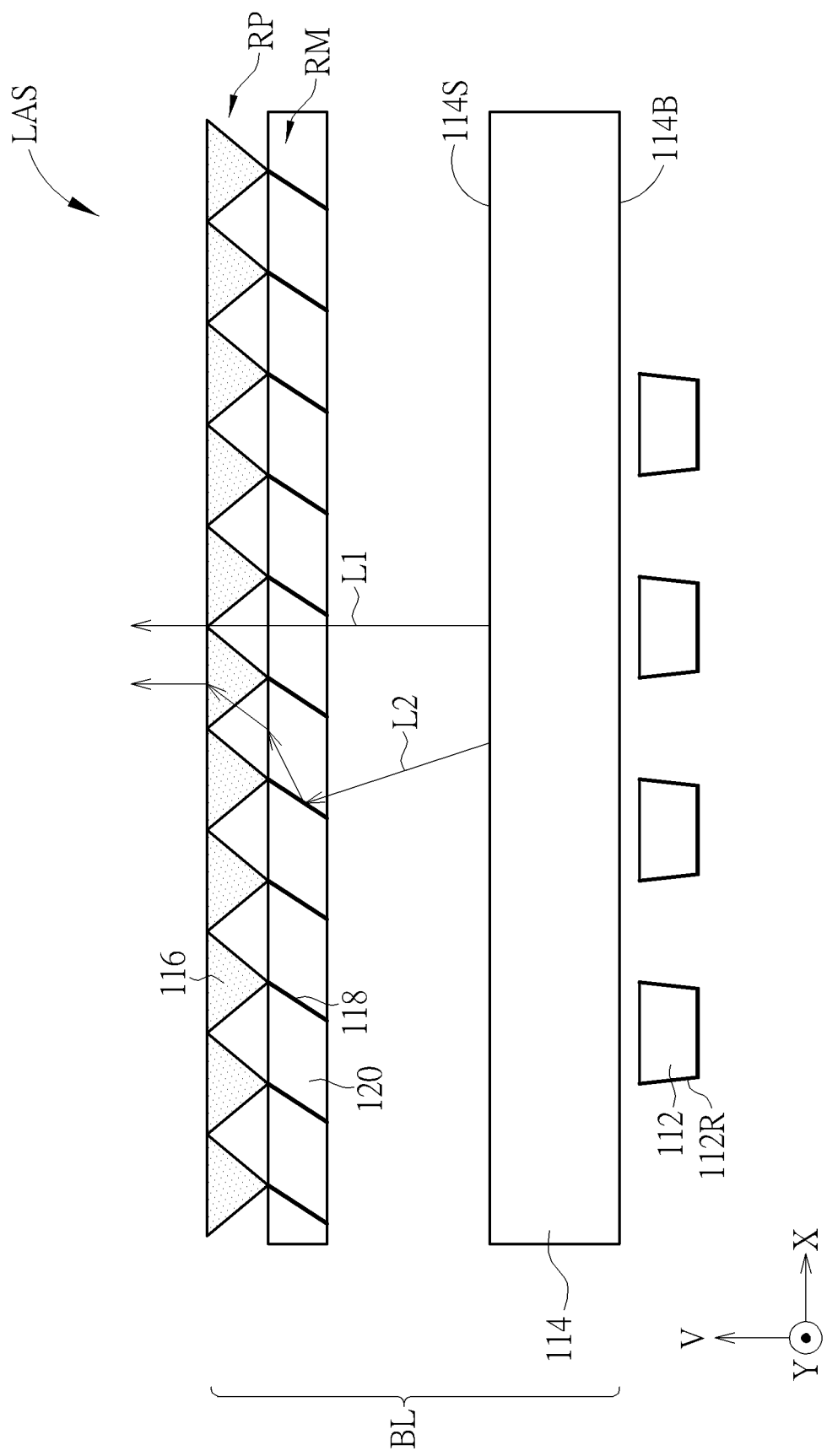
FIG. 6 is a schematic diagram illustrating a cross-sectional view of the light adjusting structure according to a third embodiment.

Referring to FIG. 6, it is a schematic diagram illustrating a cross-sectional view of the light adjusting structure according to a third embodiment. Different from the first embodiment, the backlight module BL may be a direct-lit type backlight module, and the light emitting sources 112 may be disposed and adjacent to the bottom surface 114B of the optical layer 114, but not limited thereto. In some embodiments, a reflective layer 112R may be disposed on the side surface of at least one of the light emitting sources 112 or bottom surface of at least one of the light emitting sources 112. The reflective layer 112R may be used for reflecting the light emitted by the corresponding light emitting source 112 toward the optical layer 114. The material of the reflective layer 112R may include suitable reflective material, such as metal, white reflective material, but not limited thereto.

Figure 7:
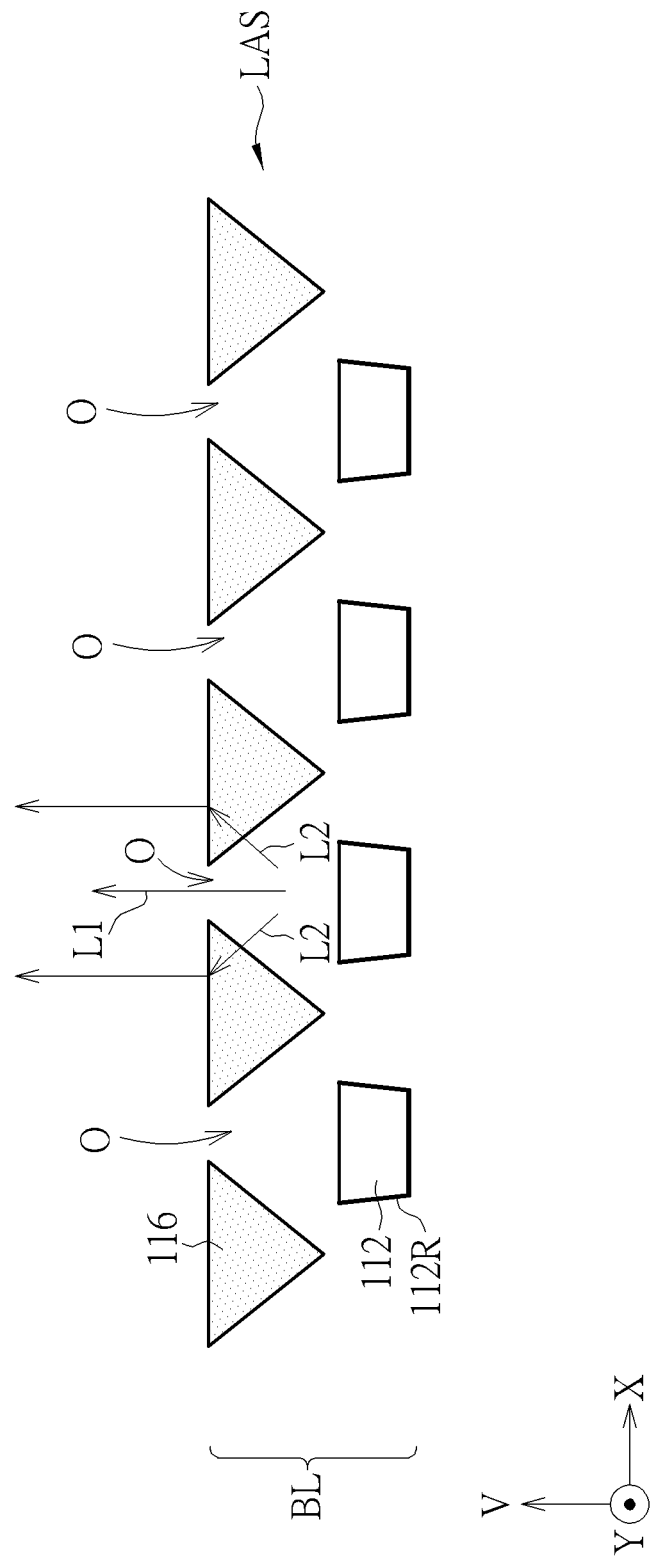
FIG. 7 is a schematic diagram illustrating a cross-sectional view of the light adjusting structure according to a fourth embodiment.

Referring to FIG. 7, it is a schematic diagram illustrating a cross-sectional view of the light adjusting structure according to a fourth embodiment. Different from the third embodiment, the light adjusting structure LAS includes a plurality of reverse prisms 116, the reverse prisms 116 are disposed on the light emitting source 112, and the light source comprises at least one light emitting source 112. The at least one light emitting source 112 may be disposed between adjacent two reverse prisms 116. In some embodiments, one of the light emitting sources 112 may be disposed corresponding to an opening O between adjacent two of the reverse prisms 116. In some embodiments, one of the light emitting sources 112 may be overlapped with the opening between adjacent two of the reverse prisms 116 in the normal direction V. As shown in FIG. 7, the reverse prisms 116 may be a cross-section of the prism bar extending in the direction Y. In some embodiments, the backlight module BL may include plural prism bars extending in the direction Y and plural prism bars extending in the direction X. The prism bars extending in the direction Y may cross the prism bars extending in the direction X to define a plurality of openings. In some embodiments, the backlight module BL may include a plural prism bars extending in the direction Y, and a plural openings extending in the direction Y are defined between two adjacent ones of the prism bars.

Figure 8:
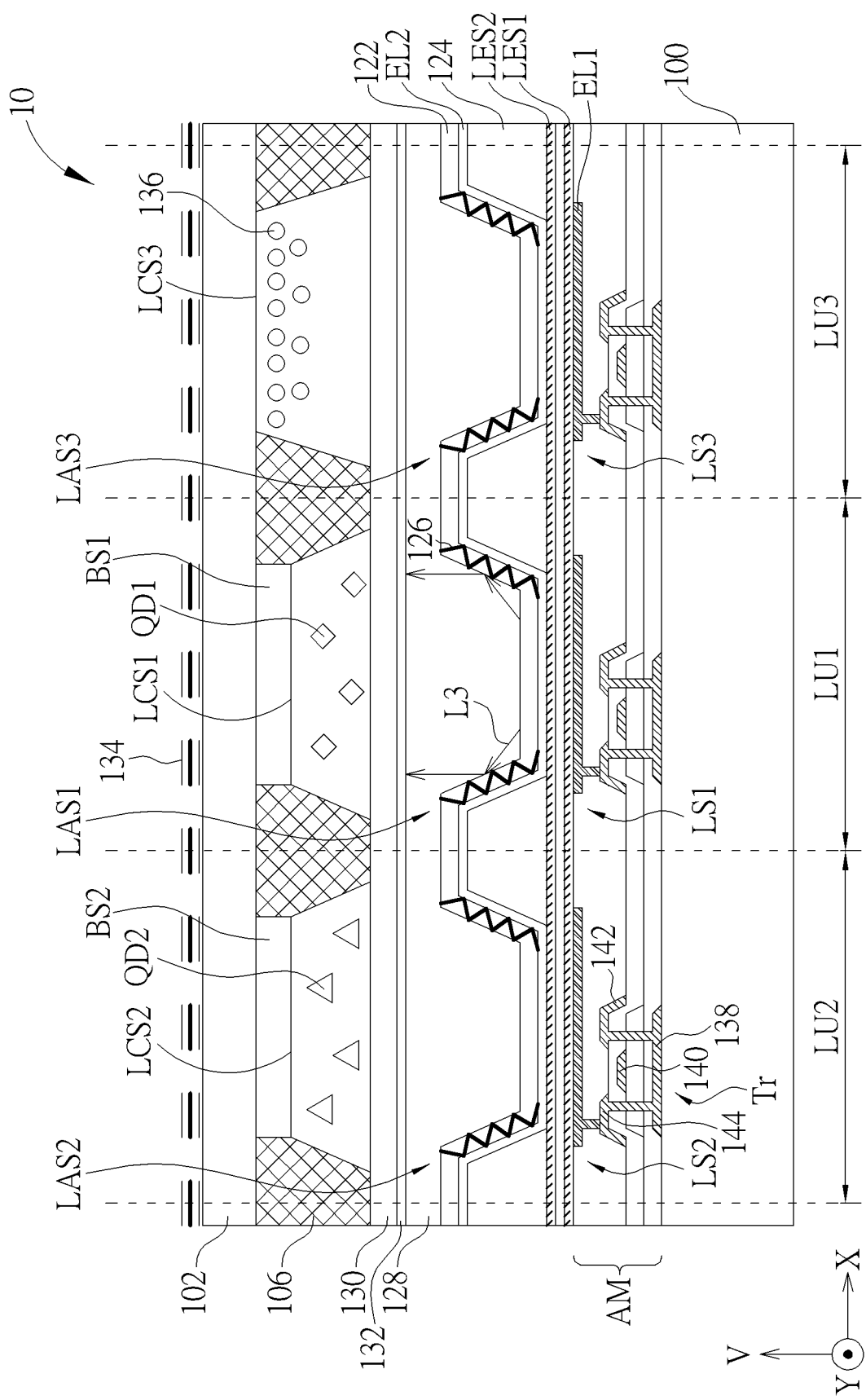
FIG. 8 is a schematic diagram illustrating a cross-sectional view of the lighting device according to a fifth embodiment.

Referring to FIG. 8, it is a schematic diagram illustrating a cross-sectional view of the lighting device according to a fifth embodiment. Different from the first embodiment, the lighting device 10 may include organic light emitting diodes (OLED). As shown in FIG. 8, a light emitting structure LES1 and a light emitting structure LES2 may be disposed between the first substrate 100 and the second substrate 102. The light emitting structure LES1 (and/or the light emitting structure LES2) may extend through and correspond to the first lighting unit LU1, the second lighting unit LU2, and the third lighting unit LU3. The light emitting structure LES1 (and/or the light emitting structure LES2) may include organic light emitting material, quantum dots, other suitable materials or the combination thereof, but not limited thereto. In some embodiments, the lighting device 10 may include at least one light emitting structure. In some embodiments, the light emitting structure may be continuous. In some embodiments, the light emitting structure may be discontinuous, and the light emitting structure may be disposed in one lighting unit.

The light emitting structures LES1 and LES2 may be disposed between a plurality of first electrodes EL1 and a second electrode EL2. One first electrode EL1 may be respectively disposed in the first lighting unit LU1, the second lighting unit LU2, and the third lighting unit LU3. The second electrode EL2 may extend through and correspond to the first lighting unit LU1, the second lighting unit LU2, and the third lighting unit LU3. The second electrode EL2 may be one of cathode and anode, and the first electrodes EL1 may be another one of cathode and anode. The material of the second electrode EL2 may include transparent conductive material, such as indium tin oxide (ITO), indium zinc oxide (IZO), aluminum zinc oxide (AZO), but not limited thereto. The material of the first electrodes EL1 may include reflective conductive material (e.g. metal), but not limited thereto.

An isolation layer 122 may be disposed on the second electrode EL2 and extend through and correspond to the first lighting unit LU1, the second lighting unit LU2, and the third lighting unit LU3. The material of the isolation layer 122 may include inorganic layer or organic layer, but not limited thereto. In some embodiments, the material of the isolation layer 122 may be an inorganic-organic-inorganic (MI) layer. Taking the first lighting unit LU1 as an example, the light adjusting structure LAS1 is disposed adjacent to the light source LS1 (including the light emitting structures LES1, LES2 disposing in the first lighting unit LU1), and the light adjusting structure LAS1 may be discontinuous, which means the light adjusting structure LAS1 is separated from the light adjusting structures LAS2 and LAS3. In addition, a wall 124 (e.g. the lighting unit (pixel) definition layer) may have a plurality of opening to define different lighting units (the first lighting unit LU1, the second lighting unit LU2, and the third lighting unit LU3). In some embodiments, the light adjusting structure LAS1 (the light adjusting structure LAS2 or the light adjusting structure LAS3) may be disposed on at least one side surface of the wall 124. The light adjusting structure LAS1 may include diffuser layer or reflective layer, but not limited. For example, the light adjusting structure LAS1 may include an isolation layer 122 and a reflecting surface 126, the reflecting surface 126 is disposed inside the isolation layer 122. In some embodiments, the reflecting surface 126 may a have zigzag structure, a strip structure, or other suitable shapes, but not limited. In some embodiments, the material of the reflecting surface 126 may include reflective material, such as metal, white reflective material, but not limited thereto. In some embodiments, the reflecting surface 126 may be single layer structure or composite layer structure. In some embodiments, the reflecting surface 126 may be a plurality of layers with different refractive indexes stacked together. The isolation layer 122 may include at least one organic layer or at least one inorganic layer, and the reflecting surface 126 may be disposed in the isolation layer 122. For example, the reflecting surface 126 may be disposed inside at least one of the layers of the isolation layer 122, or the reflecting surface 126 may be disposed between two of the layers of the isolation layer 122.

In some embodiments, the reflecting surface 126 of the light adjusting structure LAS1 is disposed on at least one side surface of the wall 124, an oblique light L3 emitted from the light source LS1 may be reflected by the reflecting surface 126, and the emitting direction of the oblique light L3 may be adjusted to be approximately parallel to the normal direction V, wherein the light source LS1 includes part of the light emitting structures LES1, LES2 disposed in the first lighting unit LU1. In some embodiments, in the second lighting unit LU2 and the third lighting unit LU3, the light adjusting structures LAS2 and LAS3 may also include the reflecting surfaces 126. Therefore, the lights (includes the oblique light L3) emitted by the light source LS1 (LS2 or LS3) may be approximately parallel to the normal direction V or more collimated after being adjusted by the light adjusting structures LAS1 (LAS2 or LAS3).

A planarization layer 128 may be disposed on the isolation layer 122. In some embodiments, a planarization layer 130 may be disposed on the planarization layer 128, and an adhesive layer 132 may be disposed between the planarization layer 128 and the planarization layer 130. In some embodiments, the planarization layer 128 (or the planarization layer 130) may be omitted, and the adhesive layer 132 may cover the uneven isolation layer 122. In addition, a plurality of anti-reflection layers 134 may be disposed on the second substrate 102. The anti-reflection layers 134 may be a polarizer or a wire grid polarizer (WGP), but not limited to.

In some embodiments, in the first lighting unit LU1 (and/or the second lighting unit LU2), a blocking structure BS1 (and/or a blocking structure BS2) may be disposed between the light converting structure LCS1 (and/or light converting structure LCS2) and the second substrate 102. The blocking structure may include the Bragg layer, yellow color filter, color filter with other wavelengths, other suitable materials, or the combination thereof, but not limited thereto. In some embodiments, the light converting structure LCS3 may include scattering particles 136, but not limited thereto.

An active matrix layer AM may be disposed between the light emitting structure LES1 and the first substrate 100. The active matrix layer AM may include plural transistors Tr. The first lighting unit LU1, the second lighting unit LU2, and the third lighting unit LU3 may respectively include at least one transistor Tr, but not limited thereto. The first electrodes EL1 may be electrically connected to the corresponding transistors Tr. The transistor Tr may include an active layer 138, a gate electrode 140, a source electrode 142, and a drain electrode 144.

Figure 9:
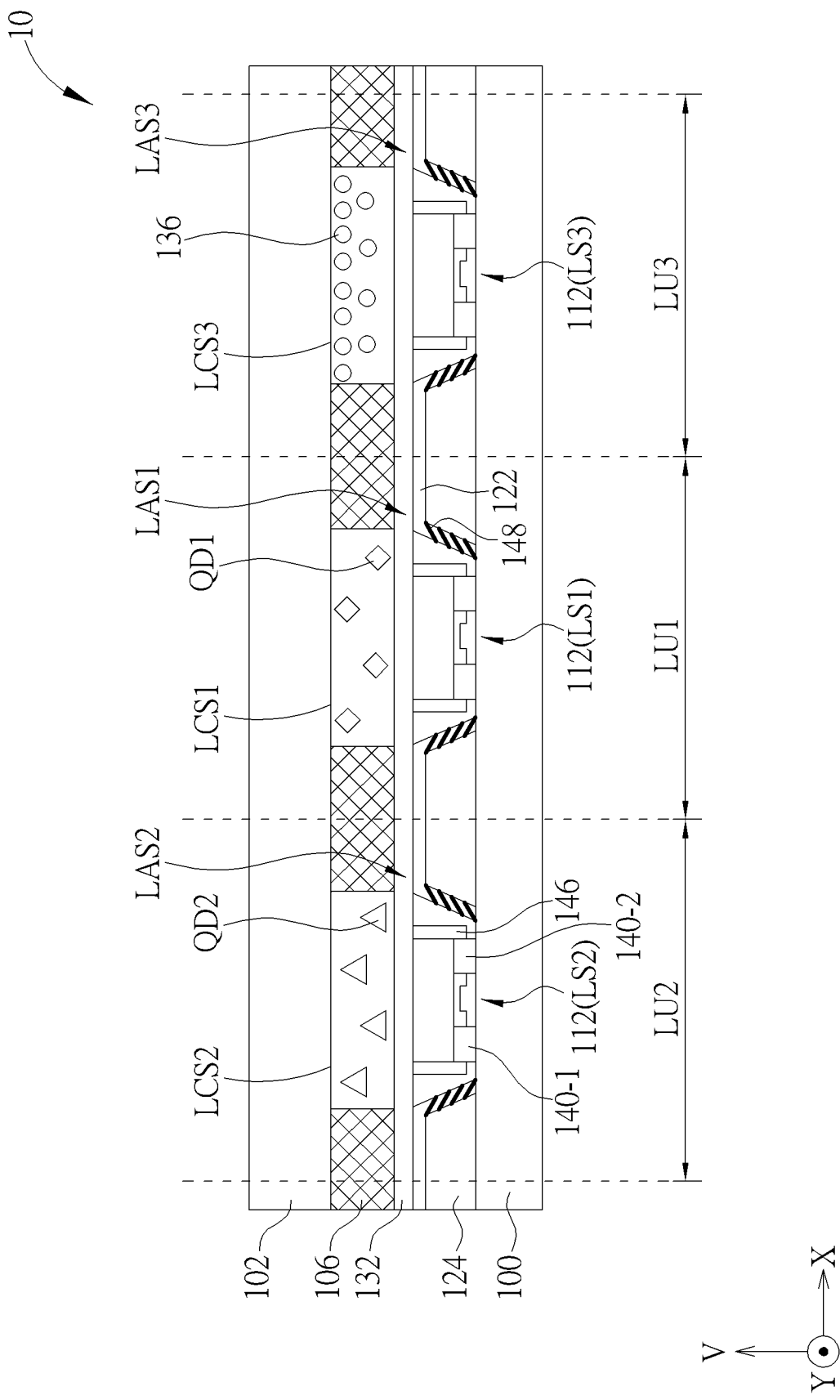
FIG. 9 is a schematic diagram illustrating a cross-sectional view of the lighting device according to a sixth embodiment.

Referring to FIG. 9, it is a schematic diagram illustrating a cross-sectional view of the lighting device according to a sixth embodiment. Different from the first embodiment, the lighting device 10 may include light emitting diodes (LED). As shown in FIG. 9, the light sources LS1, LS2, and LS3 may be disposed between the first substrate 100 and the second substrate 102. The first lighting unit LU1, the second lighting unit LU2, or the third lighting unit LU3 may respectively include at least one light emitting source 112 disposed on the first substrate 100. The light emitting source 112 may include LED, micro-LED, mini LED, quantum dots LEDs (QLEDs or QD-LEDs), but not limited thereto. In one light emitting source 112, it may include a conductive layer 140-1, a conductive layer 140-2, and a protective layer 146, and the protective layer 146 may be adjacent to at least one side of the conductive layer140-1 or 140-2, but not limited thereto. In addition, the adhesive layer 132 may be disposed between at least one of the light emitting sources 112 and at least one of the light converting structures, but not limited thereto.

Taking the first lighting unit LU1 as an example, the light adjusting structure LAS1 may be disposed on at least one side surface of the wall 124. In some embodiments, the light adjusting structure LAS1 may include a portion of the isolation layer 122 including a plurality of reflecting surfaces 148 disposed in the isolation layer 122. The reflecting surfaces 148 may not be parallel to the normal direction V nor the direction X, and the reflecting surfaces 148 may be approximately parallel to each other, but not limited thereto. In some embodiments, the slope of the reflecting surfaces 148 may be similar to the slope of the corresponding side surface of the wall 124 where the reflecting surfaces 148 are formed thereon. In some embodiments, the slope of the reflecting surfaces 148 may be different from the slope of the corresponding side surface of the wall 124 where the reflecting surfaces 148 are formed thereon.

In some embodiments, the material of the reflecting surfaces 148 may include a reflective material, such as metal, white reflective material, but not limited thereto. The isolation layer 122 may include plural organic layers and plural inorganic layers, and the reflecting surfaces 148 may be disposed in one of the layers of the isolation layer 122 or multiple layers of the isolation layer 122, or the reflecting surfaces 148 may be disposed between two of the layers in the isolation layer 122.

Since the reflecting surfaces 148 of the light adjusting structure LAS1 is disposed on at least one of the side surfaces of the wall 124, an oblique light emitted by the light source LS1 may be reflected by the reflecting surfaces 148, and the direction of the oblique light emitted by the light source LS1 may be adjusted to be approximately parallel to the normal direction V. In the second lighting unit LU2 and the third lighting unit LU3, the light adjusting structures LAS2 and LAS3 may include the reflecting surfaces 148. Therefore, the lights emitted by the light sources (such as LS1, LS2, and LS3) may be approximately parallel to the normal direction V (or more collimated) after being adjusted by the light adjusting structures (such as LAS1, LAS2, and LAS3).

In some embodiments, the lighting devices 10 in the above embodiments may be applied to the transportation, such as car, train, or airplane, but not limited thereto.

Since the amount of the light unconverted by the light converting structure in the tilt direction T is less than the amount of the light unconverted by the light converting structure in the normal direction V, and the possibility of the light emitted by the light source emitting to the adjacent lighting units is decreased, the color of the signal light perceived by the viewer (or driver) may be more pure.

In summary, the lighting device may include light adjusting structure, and the light emitted by the light source may be collimated or adjusted to be approximately parallel to the normal direction by the light adjusting structure. In some embodiments, the light adjusting structure may include the reverse prism sheet and the reflecting member. In some embodiments, the light adjusting structure may include the isolation layer and the reflecting surface disposed into the isolation layer. Therefore, the possibility of the light emitted by the lighting unit emitting to the adjacent lighting units decreases, and the lighting quality (or display quality) increases.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A lighting device, comprising:
   a plurality of first lighting units emitting a first output light, each of the plurality of first lighting units comprising:
   a first light source configured to provide a light;
   a first reflective layer configured to reflect the light; and
   a first light converting structure configured to convert the light into the first output light,
   wherein the first output light has a sub peak between 400 nm and 500 nm and a main peak between 590 nm and 780 nm, and a normal intensity of the sub peak is greater than a tilt intensity of the sub peak, and
   wherein the normal intensity of the first output light is measured along a normal direction, the tilt intensity of the first output light is measured along a tilt direction, and the normal direction is different from the tilt direction.

2. The lighting device of claim 1, wherein the tilt intensity of the sub peak decreases when a tilt angle increases according to the normal direction of the lighting device.

3. The lighting device of claim 1, wherein a ratio of the tilt intensity of the sub peak to the normal intensity of the sub peak is in a range from 0.001 to 0.97.

4. The lighting device of claim 1, wherein the first light converting structure is disposed on the first light source.

5. The lighting device of claim 1, wherein the first light converting structure comprises a plurality of quantum dots, a fluorescent material, or a phosphorescent material.

6. The lighting device of claim 1, wherein the first reflective layer comprises a metal or a white reflective material.

7. A lighting device, comprising:
   a plurality of lighting units emitting an output light, each of the plurality of lighting units comprising:
   a light source configured to provide a light;
   a reflective layer configured to reflect the light; and
   a light converting structure configured to convert the light into the output light,
   wherein the output light has a sub peak between 400 nm and 500 nm and a main peak between 520 nm and 589 nm, and a normal intensity of the sub peak is greater than a tilt intensity of the sub peak, and
   wherein the normal intensity of the output light is measured along a normal direction, the tilt intensity of the output light is measured along a tilt direction, and the normal direction is different from the tilt direction.

8. The lighting device of claim 7, wherein the tilt intensity of the sub peak decreases when a tilt angle increases according to the normal direction of the lighting device.

9. The lighting device of claim 7, wherein a ratio of the tilt intensity of the sub peak to the normal intensity of the sub peak is in a range from 0.001 to 0.97.

10. The lighting device of claim 7, wherein the light converting structure is disposed on the light source.

11. The lighting device of claim 7, wherein the light converting structure comprises a plurality of quantum dots, a fluorescent material, or a phosphorescent material.

12. The lighting device of claim 7, wherein the reflective layer comprises a metal or a white reflective material.

* * * * *